(12) United States Patent
Rodkey et al.

(10) Patent No.: US 7,869,576 B1
(45) Date of Patent: Jan. 11, 2011

(54) POWER MANAGEMENT SYSTEM FOR A PLURALITY OF AT LEAST PARTIALLY RECHARGEABLE VEHICLES

(75) Inventors: Ryan Scott Rodkey, Sugar Land, TX (US); John Frank Rodkey, Missouri City, TX (US); Mark Stephen Ledder, Fredricksburg, TX (US); David Lynn Hickey, Rosharon, TX (US); Darren Lynn Ross, Sugar Land, TX (US); Ronald F. Ramsey, St. Petersburg, FL (US)

(73) Assignee: TechRadium, Inc., Sugar Land, TX (US)

( * ) Notice: Subject to any disclaimer, the term of this patent is extended or adjusted under 35 U.S.C. 154(b) by 916 days.

(21) Appl. No.: 11/746,509

(22) Filed: May 9, 2007

Related U.S. Application Data

(63) Continuation-in-part of application No. 11/522,731, filed on Sep. 18, 2006, now Pat. No. 7,418,085, which is a continuation-in-part of application No. 11/117,594, filed on Apr. 28, 2005, now Pat. No. 7,130,389.

(51) Int. Cl.
 *H04M 11/04* (2006.01)
(52) U.S. Cl. .................. 379/37; 320/107; 320/108; 320/109; 320/124; 320/134; 340/507; 362/200; 379/40; 379/88.12; 385/137; 455/412.2; 607/57
(58) Field of Classification Search ............... 320/107, 320/108, 109, 124, 134, 137; 340/507; 362/200; 379/37, 40, 88.12; 385/137; 455/412.2; 607/57
See application file for complete search history.

(56) References Cited

U.S. PATENT DOCUMENTS

| 5,317,620 | A | * | 5/1994 | Smith | .......................... 379/40 |
| 5,694,019 | A | | 12/1997 | Uchida et al. | |
| 5,999,094 | A | * | 12/1999 | Nilssen | ....................... 340/507 |
| 6,404,880 | B1 | | 6/2002 | Stevens | |
| 6,442,241 | B1 | | 8/2002 | Tsumpes | |
| 6,463,462 | B1 | | 10/2002 | Smith | |
| 6,496,568 | B1 | | 12/2002 | Nelson | |
| 6,643,355 | B1 | | 11/2003 | Tsumpes | |

(Continued)

*Primary Examiner*—Gerald Gauthier
(74) *Attorney, Agent, or Firm*—Buskop Law Group, PC; Wendy Buskop

(57) ABSTRACT

A power management system for a plurality of rechargeable vehicles comprising an administrator interface for transmitting messages to a rechargeable station network using a processor in communication with data storage; a dynamic information database comprising a classification for at least one user, a rechargeable station identification, a user contact device information, discretionary power consumption information, and at least one dispatchable or non-dispatchable power source; and computer instructions in the data storage for instructing the processor to provide at least one message to the rechargeable station network. An administrator initiates distribution of the at least one message, which is transmitted through at least one industry standard protocol, and the administrator manages distribution and usage of the dispatchable power and non-dispatchable power to the rechargeable station network.

34 Claims, 3 Drawing Sheets

U.S. PATENT DOCUMENTS

| | | | |
|---|---|---|---|
| 6,678,358 B2 | 1/2004 | Langsenkamp et al. | |
| 6,683,870 B1 | 1/2004 | Archer | |
| 6,697,477 B2 | 2/2004 | Fleischer | |
| 6,762,586 B2 * | 7/2004 | Choi | 320/107 |
| 6,816,878 B1 | 11/2004 | Zimmers et al. | |
| 6,842,772 B1 | 1/2005 | Delaney et al. | |
| 6,871,214 B2 | 3/2005 | Parsons | |
| 6,888,338 B1 * | 5/2005 | Popescu-Stanesti et al. | 320/137 |
| 6,912,691 B1 | 6/2005 | Dodrill et al. | |
| 6,931,415 B2 | 8/2005 | Nagahara | |
| 6,970,535 B2 | 11/2005 | Gregory et al. | |
| 6,973,166 B1 | 12/2005 | Tsumpes | |
| 6,999,562 B2 | 2/2006 | Winick | |
| 6,999,565 B1 | 2/2006 | Delaney et al. | |
| 7,006,749 B2 * | 2/2006 | Illich et al. | 385/137 |
| 7,042,350 B2 | 5/2006 | Patrick | |
| 7,069,303 B2 | 6/2006 | Sikora et al. | |
| 7,184,521 B2 | 2/2007 | Sikora et al. | |
| 7,211,986 B1 * | 5/2007 | Flowerdew et al. | 320/108 |
| 7,239,112 B2 * | 7/2007 | Kangas et al. | 320/134 |
| 7,253,586 B2 * | 8/2007 | Kangas et al. | 320/124 |
| 7,349,741 B2 * | 3/2008 | Maltan et al. | 607/57 |
| 7,353,256 B2 | 4/2008 | Delaney et al. | |
| 7,401,147 B2 | 7/2008 | Sikora et al. | |
| 7,409,428 B1 | 8/2008 | Brabec et al. | |
| 2002/0032020 A1 | 3/2002 | Brown | |
| 2002/0095414 A1 | 7/2002 | Barnett et al. | |
| 2002/0156759 A1 | 10/2002 | Santos | |
| 2002/0159570 A1 | 10/2002 | Langsenkamp et al. | |
| 2003/0186716 A1 | 10/2003 | Dorenbosch et al. | |
| 2004/0070368 A1 * | 4/2004 | Heigl et al. | 320/109 |
| 2005/0013417 A1 | 1/2005 | Zimmers et al. | |
| 2005/0128740 A1 * | 6/2005 | Currie et al. | 362/200 |
| 2005/0242768 A1 * | 11/2005 | Pandit et al. | 320/107 |
| 2005/0242944 A1 | 11/2005 | Bankert | |
| 2005/0272368 A1 | 12/2005 | Langsenkamp et al. | |
| 2005/0272412 A1 | 12/2005 | Langsenkamp et al. | |
| 2007/0096894 A1 | 5/2007 | Lemmon | |
| 2008/0143548 A1 | 6/2008 | Grimmelmann et al. | |
| 2009/0077045 A1 | 3/2009 | Kirchmeier et al. | |
| 2009/0131088 A1 | 5/2009 | Kirchmeier et al. | |
| 2009/0135008 A1 | 5/2009 | Kirchmeier et al. | |
| 2009/0156240 A1 | 6/2009 | Kirchmeier et al. | |

\* cited by examiner

POWER MANAGEMENT SYSTEM FOR A PLURALITY OF AT LEAST PARTIALLY RECHARGEABLE VEHICLES

CROSS REFERENCE TO RELATED APPLICATIONS

This patent application claims the benefit, under 35 USC §120, of the prior Non-Provisional application Ser. No. 11/522,731, filed on Sep. 18, 2006, which claims priority to prior Non-Provisional application Ser. No. 11/117,594, which was filed Apr. 28, 2005, now U.S. Pat. No. 7,130,389.

FIELD

The present embodiments relate generally to a power management and monitoring system with an immediate response component for managing power from a plurality of power sources, such as; wind, solar, and even oil for balanced power distribution to owners of rechargeable vehicles.

BACKGROUND

Owners of rechargeable vehicles, or partially rechargeable vehicles need to plug in alternative locations other than their residences.

There has been a need to provide recharging stations for these types of vehicles that can be monitored and managed so that drivers of rechargeable cars, trucks, boats, and other vehicles will be able to plug in, rather than wait in long lines, for an open port.

A need exists for a system and method for automating and delivering messages concerning power availability to members of a power management or rechargeable vehicle network, which include messages to facility managers, individuals, vendors and others, so that automobiles and other vehicles can easily find a place to recharge.

A need exists for a system and method that can be used in the face of a major hurricane or other natural disaster to regulate and inform members of the network concerning power availability.

A need exists for a digital information and response system to bridge the gap between the government and the public for communicating power availability with individuals, users, which can include hospitals, fire stations, and first responders without being limited to one communication device or one message.

A need exists for a method of communication from an administrator which reaches all possible forms of communication devices, so that all members of a power management network can be reached in multiple languages.

The present embodiments meet these needs.

BRIEF DESCRIPTION OF THE DRAWINGS

The detailed description will be better understood in conjunction with the accompanying drawings as follows.

Figure 1:
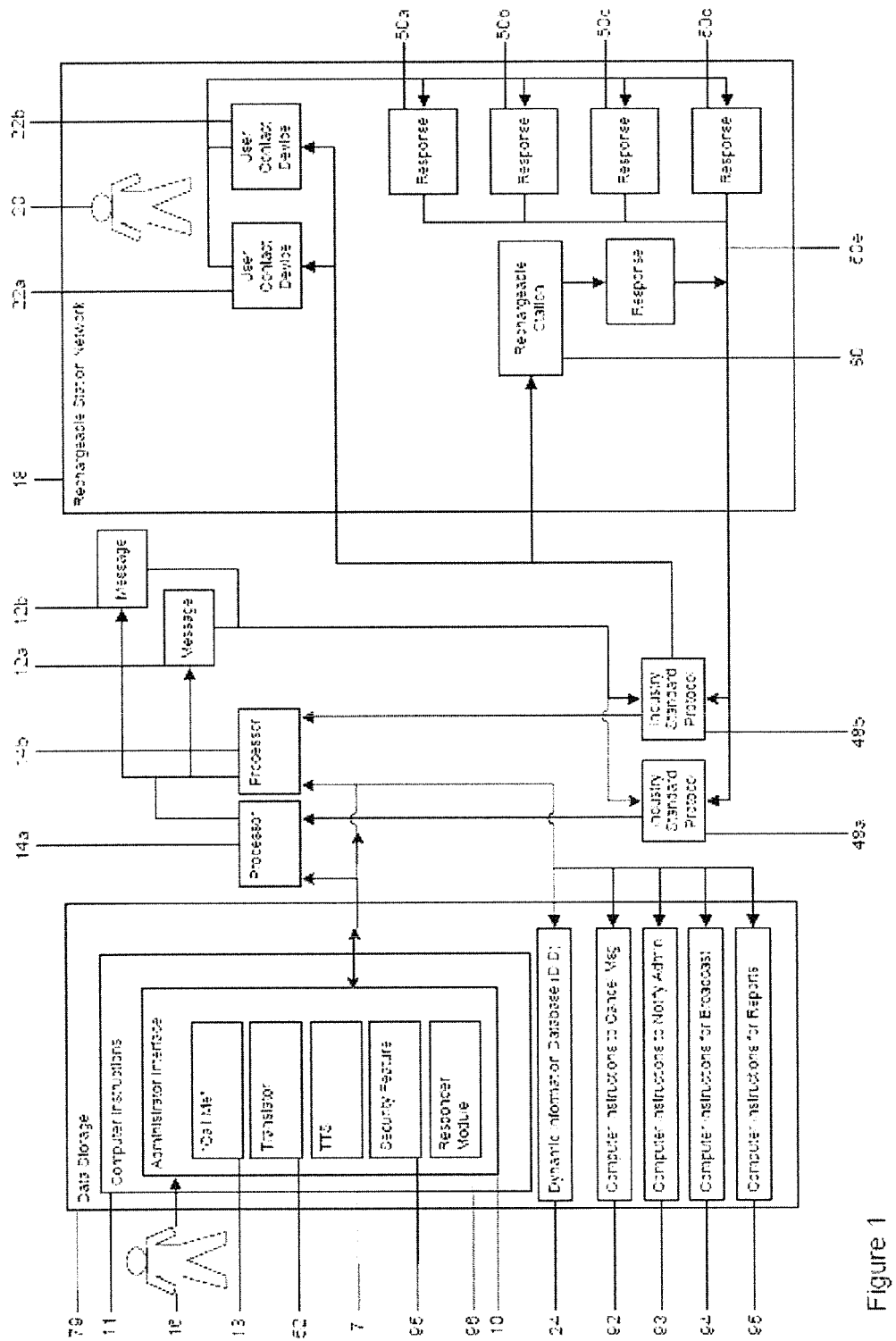
FIG. 1 depicts a representation of an embodiment of a digital notification and response system for handling power management.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to an immediate response information system or emergency system for use during brown outs, periods of high energy demand, and periods where a natural disaster, such as a storm, has destroyed or limited the capacity of energy-providing infrastructure.

The present embodiments relate to a system for creating and delivering messages, routing messages, and verifying and collecting responses to the messages for rechargeable vehicle stations or users of a power generation network in need of recharging services.

The present embodiments are universally applicable to any type of messaging system and device used by message recipients.

The present power management system for a plurality of vehicles that are at least partially rechargeable includes an administrator interface for transmitting one or more messages from an administrator.

The present embodiments are contemplated for use with at least partially rechargeable vehicles or fully rechargeable vehicles, such as cars, trucks, boats, helicopters, snowmobiles, jet skis, motorcycles, and other vehicles.

The administrator interface can be a computer, a cellular telephone, a personal digital assistant, or other similar devices able to input data, messages, and commands into a processor. The administrator interface can also be a local area network interface, a wide area network interface, a virtual private network interface, a synchronous transfer mode interface, a synchronous optical network interface, a call center, a voice mail, or another similar means to transmit a message to numerous contacts.

In a contemplated embodiment, the administrator interface can have one or more security features, such as encryption, a password-protected user account, or biometric files.

The administrator interface can include a "call me" feature, enabling an administrator to compose a message to send out to at least one user.

An administrator, can be a power supplier, a governmental agency, a digital notification system, an analog notification system, a computer system, an entity responsible for coordinating dispatchable and non-dispatchable power to a rechargeable station network, and combinations thereof.

The administrator interface transmits messages from the administrator to a rechargeable station network using at least one processor in communication with data storage.

A dynamic information database is in the data storage. The dynamic information database includes a classification for at least one user, such as "critical care" for users located in hospitals in need of constant supplies of power, or "evening only" for residential users in need of power primarily during the after-work hours.

Exemplary users can include a police department, a school, a fire department, a hospital, a government agency, a consumer, a business, an association, or combinations thereof.

The dynamic information database further includes a rechargeable station identification for a rechargeable station, a user contact device information for a user contact device, or combinations thereof. Rechargeable station identification information can include a physical address, an internet protocol (IP) address, a phone number, and combinations thereof.

User contact device information can include the user's name, the user's address, the user's phone number, the user's device address, the user's social security number, an account code, and combinations thereof. Each user contact device can include information that is unique to each individual user contact device or can include information that is common to all contact devices. For example, a serial number for a cell phone, a Mac™ address for an Ethernet™ card, and other telecommunication devices can be included in dynamic information database.

A user identification can be included with the rechargeable station identification and/or user contact device information. It is also contemplated that a rechargeable station location can be included with the rechargeable station identification.

The dynamic information database further includes discretionary power consumption information for at least one user, a rechargeable station, or combinations thereof. An example of discretionary power consumption information is an amount of power that at least one user requires during a time interval that can be determined by an administrator, such as 1 hour, 4 hours, 8 hours, 2 hours every Sunday, or 3 hours on "date" night.

In an embodiment, a priority code can be assigned to discretionary power consumption information based on power rates, a user's classification, or a quantity of power needed by a user. For example, the priority codes can be "100" for critical needs users like hospitals, a priority code "200" for less critical stations, such as grocery stores, and a priority code "300" for a business, and a priority code of "400" for a residence.

For example, power rates can be set at one or more predetermined fees per kilowatt hour, and a user can be associated with a higher priority code because of higher payment per kilowatt hour. It is also contemplated that station priority codes can be paired with rechargeable stations in the rechargeable station network.

The dynamic information database is contained in data storage and additionally includes dispatchable power source information concerning dispatchable power available to the rechargeable station network, and non-dispatchable power source information concerning non-dispatchable power information available to the rechargeable station network, or combinations thereof.

Non-dispatchable power sources can include a wind power facility, a solar powered facility, an intermittent water supply hydroelectric facility for providing electricity, and similar power sources and facilities.

Dispatchable power sources can include, a hydroelectric power plant, a hydrocarbon based electrical production facility, a nuclear power plant, a geothermal power generation facility, a bank of batteries, at least one capacitor, at least one fuel cell, a tidal power generator using ocean tides or currents which provides electricity to the user or the rechargeable station, and other similar power sources and facilities.

In a contemplated embodiment, the dynamic information database can further include grouping information, such as a geographic zone, a quantity of power consumption needed by at least one user, a transmission capacity of rechargeable station network, and combinations thereof. For example, a geographic zone could be "the Gulf Coast region of the United States", the quantity of power consumption needed could be "hospital's rechargeable station needs 10,000-30,000 kilowatt hours per month". The dynamic information database can include information on transmission capacity of the rechargeable station network, such as how much power the grid can dispatch to the individual stations per hour, per day, or some other time interval.

The present system also includes computer instructions in the data storage for instructing one or more processors to transmit one or more messages to the rechargeable station network. An example of a message could be a phone call to a user to advise the user "You can recharge your partially rechargeable vehicle during the next 2 hour period."

The one or more messages can indicate when less expensive power is available for one or more users. Such as message can be initiated by the administrator over at least one industry standard protocol from the administrator to one or more users.

In an embodiment, the administrator can manage distribution and usage of the dispatchable and non-dispatchable power to the rechargeable station network based on user response, and/or by increasing demand or limiting demand using these messages.

Industry standard protocols can include a Megaco/H.248 protocol, a simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

In an embodiment, the messages can be transmitted through multiple industry standard protocols, individually or simultaneously. If the messages are transmitted simultaneously, the load management of the power if more efficient. A lot of small loads needing power can be matched to a large suppler quickly, and the system will minimize brown outs. For example, brown outs have caused many law suits recently in Texas and California; these lawsuits would be reduced dramatically with the use of this system in preventing rolling brown outs.

It is contemplated that the data storage can include computer instructions for broadcasting one or more messages to users on the network at periodic intervals, such as daily, user in a defined geographic area, such as Texas, at least one user in a designated disaster zone, such as an Oklahoma tornado zone, or to at least one user at a specific date and time, Jun. 20, 2010.

In an embodiment, the data storage can include computer instructions enabling the administrator to cancel messages in progress and messages scheduled to be transmitted at a future date and time or during a future event or situation. For example, the administrator can select a "cancel" icon on the website interface used by the administrator. Alternatively, if no human is involved, a computer could be programmed so that the computer recognizes when available power is within preset limits, and when the preset limits are exceeded, sends a cancel to the processor to stop messages from being transmitted to users that power is available.

In an additional embodiment, the data storage can include computer instructions for notifying the administrator when all messages have been delivered to the rechargeable station network. For example, the administrator might send out 100 messages, and then 80 responses are received with 20 error in responses additionally being generated.

It is contemplated that the one or more messages can be audio files, such as MP3 files, MP4 files, WAV files, AIFF files, AVI files, or ACC files, image files, video files, such as a H.264 Mpeg, text files, electronic signals, and combinations thereof.

In a contemplated embodiment, audio files can be transmitted using email, a phone, a link on a website, or combinations thereof.

In an embodiment, the present system can include a text-to-sound file converter in the data storage for translating one or more messages from text-to-sound files. The text-to-sound file converter can be used to translate a message from a text file to a sound file such as a Real Speak text-to-sound converter, of Burlington, Mass. USA. The text-to-sound file converter is beneficial because the one or more messages remain consistent through delivery by the same voice, with the same accent, dynamic, and delivery speed. Additionally, use of a text-to-sound file converter enables individuals with disabilities, namely visual impairment, to also receive the message.

It is contemplated that one or more user contact devices can transmit a response through one or more industry standard protocols to the dynamic information database. Responses can indicate that the message has been successfully received, or responses can indicate a specific need of a user. For example, a specific need of a user is a user sending a message that the user needs a specific amount of power for a certain type of rechargeable vehicle, such as a Segway™ needs to recharge on Tuesday, Jun. 10, 2023 at 4 pm.

The responses can be transmitted through multiple industry standard protocols, individually or simultaneously, or through a single industry standard protocol.

The administrator interface can include a responder module, which can have a receiver function for receiving responses from users which reply to the message. For example, a responder module would be a software program designed to acknowledge that responses arrive from users, from rechargeable stations (such as information about plugged in vehicles) and error in responses, providing tallies of the responses received for the administrator.

The responder module can include both opt-in and opt-out features, allowing users to select whether to receive messages. It is contemplated that the responder module can collect response data from the rechargeable station network that indicates one or more user contact devices have received the message.

In an embodiment, a response code from a rechargeable station, a user contact device, or combinations thereof can be stored in the dynamic information database. Alternatively, an "error in response" code from the rechargeable station, the user contact device, or combinations thereof can be sent, indicating insufficient user contact device information or insufficient rechargeable station information to transmit the message to the user contact device or rechargeable station, respectively.

The "error in response" information can also indicate that an e-mail address or phone number is invalid. This error in response information can be noted textually, such as in a report, and can be indicated typically as a tone message or another electronic signal indicating no response.

In an embodiment, the data storage can include computer instructions for instructing one or more processors to monitor the rechargeable station network and manage information relative to the dispatchable and non-dispatchable power sources to track available power usage by classification of each user, or by rechargeable station identification.

The one or more messages can include predefined messages, custom messages, other kinds of messages, and combinations thereof. The messages can be audio files, image files, video files, text files, electronic signals, or combinations thereof. An example of an electronic signal can be a radio frequency transmission.

In a contemplated embodiment, a rechargeable station can include a controller, such as a software program that uniquely manages power consumption and transmission information for specific users of the rechargeable station, a controller identification code, such as a number like 4511-Dacoma, and a member of the group: a stored energy device, at least one fuel cell, such as those made by Hydra of Portland, Oreg. or combinations thereof. The stored energy device can be a bank of batteries, at least one capacitor, or a similar device.

It is further contemplated that the present system can include computer instructions in the data storage for instructing the one or more processors to generate one or more reports using content in the dynamic information database. The reports can contain response information to the messages sent by the administrator, rechargeable station information, time and dates, geographic zones to which the report applies, power consumption in view of preset limits and excesses of preset or predefined limits, error in response information and similar data.

In an embodiment, one or more messages can be simultaneously transmitted to one or more user devices in multiple languages, and the corresponding user may select a language for the messages. For example the messages can be translated from English to Spanish, and Chinese simultaneously using a machine translator, such as Systran™ of San Diego.

The invention uses a machine-readable medium or translator, which includes computer instructions in the data storage for receiving a language preset in the user device and transmitted in that preset language and storing the preselected language selection in the dynamic information database with user contact device information.

The translator can be used convert the message from English to multiple other languages simultaneously, such as Korean, Chinese, Vietnamese, French, Spanish, Italian, Norwegian, Swedish, German, Japanese, Russian, or Portuguese, and other languages. The translator is beneficial because not all users in a network may speak the same language, such as in Canada, where a portion of a rechargeable station network might speak French and the other portion of the rechargeable station network might speak English. This feature ensures smooth and effortless communication between groups of people with language differences and enables the present embodiments to be used in multiple countries simultaneously, if desired.

The embodied immediate response information systems can immediately, in a timely and uniform manner, contact numerous users through numerous user contact devices, such as a cell phone, a television, a light emitting diode (LED) display, a land phone line, an e-mail address, a fax machine, a pager, a digital display, a similar device, and handheld wireless devices, including personal digital assistants (PDA) and Blackberries™.

The system can be used to contact individuals or rechargeable stations, to manage power access with vendors and providers, such as hospitals, during power outages and emergency conditions, such as storms or fire, and to provide notification of important information, such as thunderstorm warnings, flash flood warnings, tornado warnings, and similar information. Additionally, terrorist threat levels can be transmitted using the present machine-readable medium. The present embodiments can also be used to advise owners of vehicles regarding road conditions, bridge outages, construction, and emergency vehicle and evacuation routes, and other critical conditions.

A benefit of the invention is that users can receive messages on a real-time, instantaneous basis. The present embodiments provide a system with a high speed notification and response time, in which information is accessed and stored in a dynamic information database, and can be conveyed to users with user contact devices in a specific priority order. The messages can be conveyed in less than 3 minutes to over 1000 users. Users can be contacted automatically when specific conditions arise, or messages can be transmitted when initiated by an administrator using an administrator interface. Any number of users can be contacted in a systematic manner, and multiple responses can be obtained and stored.

The present embodiments can be used to save lives through the notification of large groups of individuals instantaneously, such as to over 1,000 people at once, concerning very dangerous road situations or dangerous power outages that may affect hospitals and other critical care facilities that use rechargeable vehicles or partially rechargeable ambulances, trucks, or transport devices. Messages can be sent to prevent false rumors that a situation is safe. Panic and chaos can be controlled through transmission of one or more consistent messages to all users in communication with the present machine-readable medium.

The present embodiments allow responses from users to be collected so that administrators can send help to users that are in danger, or that are trapped in various situations and unable to recharge. For example, an individual can be trapped in his or her home due to an inability to recharge a vehicle due to a power outage, and the individual could be injured, ill, or otherwise in need of immediate attention.

With reference to the figures, FIG. 1 depicts an embodiment of a digital notification and response system for rechargeable station network.

User 20 is depicted within rechargeable station network 18, in communication with user contact devices 22a and 22b. While user 20 is depicted in communication with two user contact devices, any number of users can be in communication with any number of user contact devices.

FIG. 1 also depicts at least one user 20 in communication with at least one recharge station 80 which is in communication with the rechargeable station network. It is contemplated that the network can contain many user contact devices such as over 10,000 users with at least a similar number of rechargeable stations.

User contact devices 22a and 22b and the rechargeable stations 80 can each generate a response into the rechargeable station network.

An administrator interface 10, is used for preparing and transmitting messages 12a and 12b, which can be in one or more languages, from an administrator 16 using at least one processor 14a.

FIG. 1 depicts two processors 14a and 14b, though any number of processors can be used depending on the number of messages, users, and rechargeable stations in communication with the administrator interface 10.

Further, while FIG. 1 depicts two messages 12a and 12b, any number of identical messages or different, individualized messages can be sent to any number of individual users.

Administrator interface 10 can be a computer, a cellular telephone, a personal digital assistant, or other similar devices able to input data, messages 12a and 12b, and commands into processors 14a and 14b. The administrator interface 10 can also be a local area network interface, a wide area network interface, a virtual private network interface, a synchronous transfer mode interface, a synchronous optical network interface, a call center, a voice mail, or another similar means to transmit a message to numerous contacts.

The processors 14a and 14b communicate with a dynamic information database 24 stored in data storage 79 in communication with the one or more processors 14a, 14b.

The dynamic information database 24 is used in preparing the messages 12a or 12b and receiving responses 50a, 50b, 50c, and 50d from individual users, or from individual rechargeable stations shown as element 50e.

Figure 2:
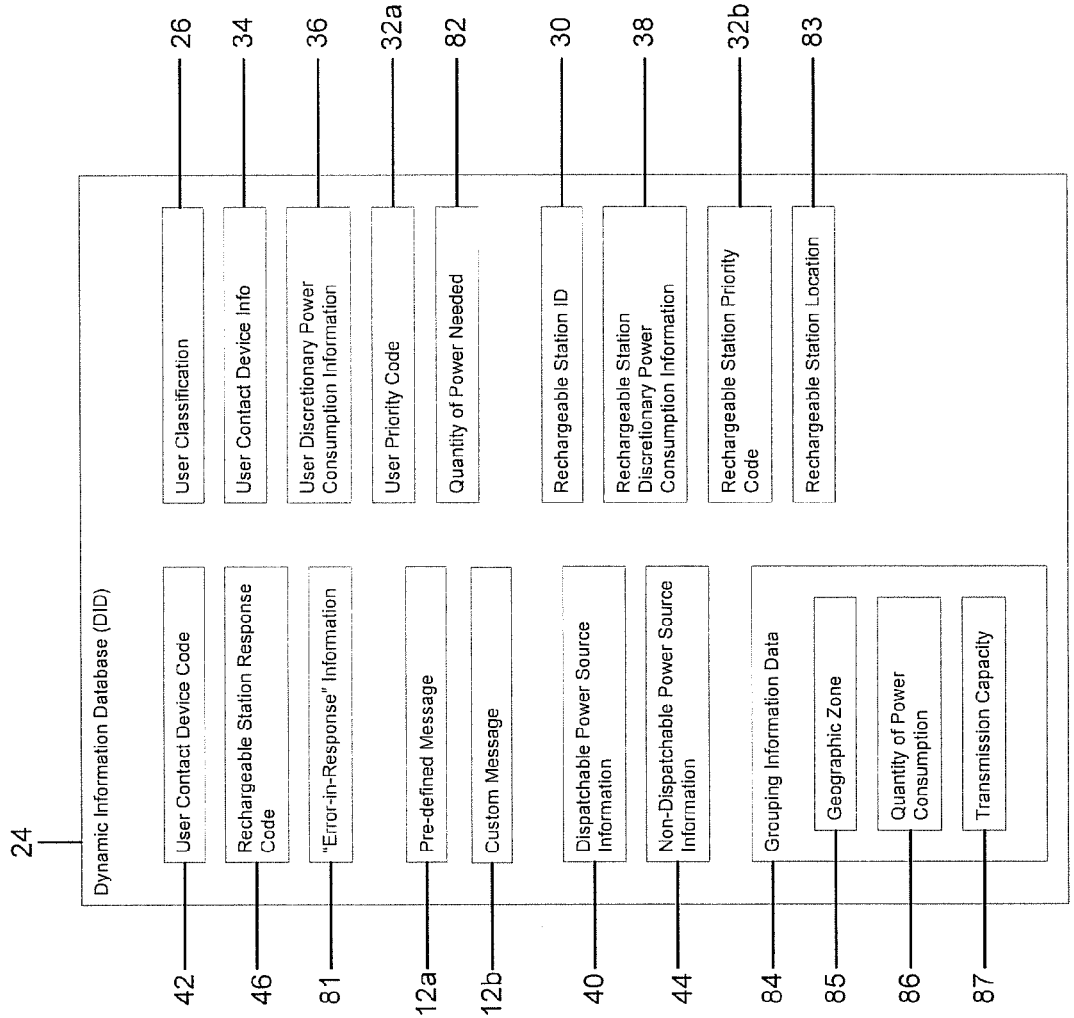
FIG. 2 depicts a representation of an embodiment of a dynamic information database associated with a digital notification and response system.

The administrator interface 10 initiates distribution of messages 12a and 12b to the rechargeable station network 18 using information from the dynamic information database, namely, grouping information data 84, user contact device information 34, and priority codes for users 32a and priority codes for rechargeable station 32b, see also FIG. 2.

The priority code 32 can be a priority order that directs the administrator interface to contact a first group of user contact devices indicated as a first contact. After all of the user contact devices in the first contact have received the message, a priority order can be used to direct the administrator interface to contact a second group of user contact devices indicated as a second contact. For example, the priority order set by a particular user can be, first email a PDA with a defined email address, then, call a home phone number, then call a work phone number. The administrator interface then transmits the message in that priority order. The priority code is one that is used in view of all the users of the network.

In an embodiment, it is contemplated that the administrator interface will continue to contact user contact devices based on the priority order indicated by the users of the system, until all user contact devices are reached, and a response is provided from the user contact devices to the dynamic information database. The response from the user contact device can be "message received," a message that is actuated by the user.

The administrator interface 10 is depicted in communication with a text-to-speech converter 7 and a language translator 52.

In an embodiment the administrator 16 to cancel any messages in progress or any messages pre-set to be sent on a specific date or time or in the case of a specific event or situation using computer instructions for cancelling a message 92.

Computer instructions 92 can additionally enable administrator 16 to transmit a "disregard message" notification to users that received a message in error, or when a message is erroneously transmitted or contains erroneous information.

The messages 12a or 12b can be transmitted through one or more industry standard protocols 48a and 48b, individually or simultaneously. Industry standard protocols 48a and 48b can be any type of gateway protocol or similar protocol. Messages 12a and 12b are then received by user contact devices 22a and 22b within the rechargeable station network 18.

In an embodiment, it is contemplated that the administrator interface 10 can initiate the sending of messages 12a and 12b automatically based on a disaster. For example, if a storm destroys multiple power lines in a specified area, the administrator interface 10 can be notified automatically, and can send the messages 12a and 12b to the appropriate user contact devices of affected users.

In different embodiments, it is contemplated that the messages can be a text message, a numerical message, one or more images, or a combination thereof. The messages 12a, 12b can be encoded, such as with encryption such as AES 128 or 3DES encryption.

The messages 12a, 12b may include a designation that identifies each message importance to all the users of the network. Examples of these designations include low priority, general priority, significant priority, high priority, and severe priority. The designations can coincide with the US Department of Homeland Security's five-color system. For example, the designations can be color-coded, such as green for a low priority message, blue for a preparedness message or general priority message, yellow for a cautionary message such as a significant priority, orange for an emergency message or high priority message, or red for a critical message with a severe priority. These priority levels can be customized to levels of emergencies, such as the use of red for a category 5 hurricane.

The message or messages 12a, 12b are stored on the dynamic information database 24. The messages 12a, 12b can be prewritten messages stored in the dynamic information database 24 for subsequent use by the administrator 16 or can be generated from the dynamic information database 24 based upon inputs from the administrator 16, "custom messages" and transmitted using the administrator interface 10.

The administrator interface 10 can also include a "call me" feature 13. The "call me" feature 13 enables an administrator 16 to compose a message to send to members of the rechargeable station network 18.

FIG. 1 also depicts computer instructions to notify the administrator 93 disposed within the data storage to advise the administrator about available dispatchable and non-dispatchable power and upcoming usage needs. Additionally computer instructions can be shown in the data storage for broadcasting 94 as described above. Computer instructions for generating reports 97 can also be contained in the data storage.

The administrator interface 10 can further include a responder module 96, as described above and a security feature 95

FIG. 2 shows a schematic depiction of the dynamic information database 24. The dynamic information database 24 can be a SQL™ database, MySQL™ database or other industry standard databases, an Oracle™ database, or other similar databases that can organize information in a similar manner.

It is contemplated that the dynamic information database 24, resident in data storage 79 in communication with processors 14a and 14b. The database 24 contains a user classification 26, such as a type of facility or individual, for each user, such as user 20, depicted in FIG. 1.

For example, a facility can contain a rechargeable station 80. For example, a hospital can have a station and be classified as a "critical care" station for its ambulance, needing constant power. In contrast, a residential user can be classified as "evening status," and receive power only in the evening after work hours.

Classifications and priorities can be assigned based on status as an emergency care provider, high end residences, military operation facilities, homeland security facilities, critical governmental facilities, the general public, communication networks, traffic systems, and public broadcast systems.

A user can be an individual, a business, or other entities.

It should be noted that the user contact device information can include an e-mail address, an internet protocol (IP) address, a phone number, and combinations thereof. The information can further include the user's name, the user's address, the user's phone number, the user's device address, the user's social security number, an account code, and combinations thereof. Each user contact device can include information that is unique to each individual user contact device or can include information that is common to all contact devices. For example, a serial number for a cell phone, a Mac address for an Ethernet card, and other telecommunication devices can be included in dynamic information database 24.

Additionally, dynamic information database 24 contains rechargeable station identification 30 such as an identification code, an address, a phone number, a social security number of users at the rechargeable station 80, a tax identification number, a bank account, or combinations thereof, for each rechargeable station 80 in the rechargeable station network. Similar information can be stored in the dynamic information database 24 relating to each user within the network such as dispatchable power source information 40, and non-dispatchable power source information 44. Rechargeable station identification 30 can include information sufficient for the administrator interface to transmit messages and receive response from related rechargeable stations.

The user discretionary power consumption information 36 for at least one user of the rechargeable station network can be an amount of power that at least one user requires during a time interval that can be determined by an administrator, such as 4 hours, 8 hours, 2 hours every Sunday, or 3 hours on "date" night. The database can also contain discretionary power consumption information of each rechargeable station in the network 38.

The dynamic information database 24 can additionally contain information on at least one non-dispatchable power source 40, such as a wind power facility, a solar powered facility, or an intermittent water supply hydroelectric facility for providing electricity. The dynamic information database 24 additionally can contain information on at least one dispatchable power source 44 such as a hydroelectric power plant, a hydrocarbon based electrical production facility, a nuclear power plant, a geothermal power generation facility, a bank of batteries, at least one capacitor, at least one fuel cell, or a tidal power generator using ocean tides which provides electricity to the user or the rechargeable station.

The dynamic information database 24 can include response codes from user contact devices 42, and response codes from rechargeable stations 46, relating to responses received from a user, or a rechargeable station.

"Error-in-Response" information 81 can also be tracked by the database 24. Error in response information can relate to failed attempts to transmit a message to a user contact device or to a rechargeable station. Error in response codes can be received when insufficient user contact device information exists to contact a user contact device or insufficient rechargeable station information exists to contact a rechargeable station. Error in response data and response data provides the administrator with knowledge whether or not one or more messages have reached the intended recipients.

The "Error-in-Response" information can also indicate that an e-mail address or phone number is invalid. This Error-in-Response information can be noted in the report as an invalid number, and can be indicated typically as a tone message or another electronic signal indicating no response.

The database 24 includes computer instructions to track and store the amount of power needed by a particular user 82, information on the actual rechargeable station location 83.

In the grouping information 84 of the database 24, there can be geographic zones 85, quantity of power consumption for a group of users 86, and transmission capacity of the network 87.

It is additionally contemplated that the discretionary power consumption information can be assigned a priority code based on power rates. Alternatively, one or more users can have a classification code which indicates a quantity of power needed by a user. For example, power rates can be set at one or more predetermined fees per kilowatt hour, and a user can be associated with a higher priority code because of higher payment per kilowatt hour.

Figure 3:
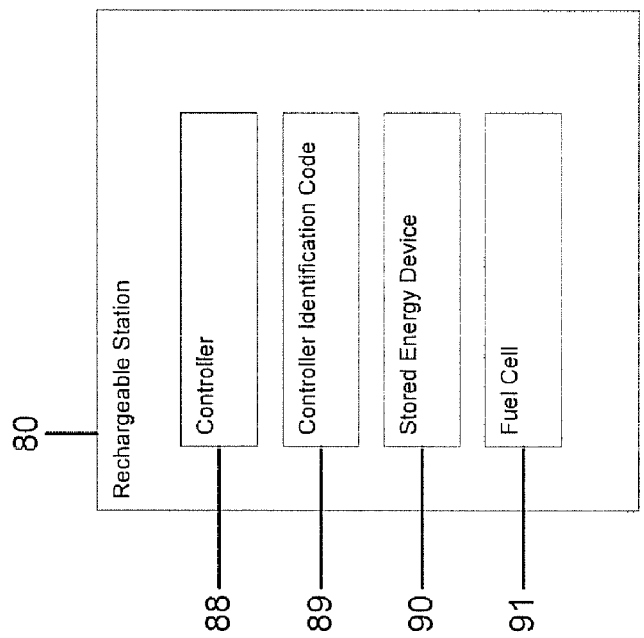
FIG. 3 depicts a representation of an embodiment of a rechargeable station.

It is further contemplated that the rechargeable station 80 can includes at least three elements shown in FIG. 3, namely, a controller 88, a controller identification code 89 and one or more of the following: a stored energy device 90, at least one fuel cell 91, or combinations of these items.

The dynamic information database stores the responses and the unique address of each contact device. The response from the user contact device and responder contact device can be an audio file or a dual-tone multi-frequency "DTMF" tone, also known as a touch tone. The "DTMF" tone can be used for telephone signaling over the line in the voice frequency band to the call switching center. The response from the user or member contact device can also be a text telephone such as "TTY" communication such as a teletype communication or a time division duplex, a "TDD" communication.

In an embodiment, the administrator interface has a responder module 96 with computer instructions that enable a receiver function to receive responses from various users that reply to messages and/or a storage function for recording received responses in audio files, a dual-tone multi-frequency "DTMF", and/or an interactive voice response "IVR" format in the dynamic information database.

In an embodiment, the responder module can have a reporting function for providing the status of the responses to the administrator. The information obtainable through reporting function can be protected using security access features which can include encryption, a user log in with password, or a biometric file. The security access features can also include a bar code reader, a radio frequency identification device "RFID" tag reader, a scannable badge reader, a security token, a smart card reader, a biometric reader, a magnetic card reader, and combinations thereof.

In an alternative embodiment, the system can include computer instructions for containing and compiling reporting information to generate reports based upon information in the dynamic information database.

The reports can include a date a message was sent, such as "Apr. 2, 2007; a time the message was sent, such as 4:10 pm; a date the message was received, such as Apr. 3, 2007; a time the message was received, such as 4:20 pm, and content of the message, such as "rolling brown out at 2 pm Apr. 4, 2007." Content of the message can be included independent of whether whole or partial message transmission occurred.

In addition the report can include user response information which can include responses, such as "I received the message from the administrator and need assistance in power because I have a medical emergency" sent by a user. The report can further include responder response information, which can include responses from responders attempting to assist users in need, and can also include "error-in-response" information such as a tone or other communication that indicates the message did not reach the intended user contact device or rechargeable station.

It is contemplated that custom reports can be created by an administrator. It is further contemplated that standard reports can be generated from the dynamic information database for use by the administrator.

The embodiments have been described in detail with particular reference to certain preferred embodiments, thereof, but it will be understood that variations and modifications can be effected within the scope of the embodiments, especially to those skilled in the art.

What is claimed is:

1. A power management system for a plurality of at least partially rechargeable vehicles comprising:
   a. an administrator interface for transmitting at least one message from an administrator to a rechargeable station network using at least one processor wherein the at least one processor is in communication with data storage;
   b. a dynamic information database in the data storage, comprising:
      i. a classification for at least one user;
      ii. at least one rechargeable station identification for at least one rechargeable station, a user contact device information for at least one user contact device, or combinations thereof;
      iii. discretionary power consumption information of the at least one user, discretionary power consumption information of the at least one rechargeable station, or combinations thereof;
      iv. at least one dispatchable power source information, at least one non-dispatchable power source information, or combinations thereof;
   c. computer instructions in the data storage for instructing the at least one processor to provide at least one message to the rechargeable station network; and
   wherein an administrator initiates distribution of the at least one message to the rechargeable station network providing non-dispatchable power information or dispatchable power information to the rechargeable station network through at least one industry standard protocol and wherein a member of the group consisting of: at least one user contact device, at least one rechargeable station, and combinations thereof provides at least one response.

2. The system of claim 1, wherein the message is received by the at least one user contact device and the at least one user contact device transmits a response through the at least one industry standard protocol to the dynamic information database.

3. The system of claim 1, further comprising computer instructions in data storage for instructing the at least one processor to monitor the rechargeable station network and manage use of a member consisting of: the at least one dispatchable power source, at least one non-dispatchable power source, or combinations thereof; to track power usage by classification of the at least one user, by rechargeable station identification, or combinations thereof.

4. The system of claim 1, wherein the dynamic information database further comprises: a response code from the at least one rechargeable station, a response code from the at last one user contact device, an "error in response" code that indicates insufficient user contact device information existed to contact the at least one user contact device, an error in response code that indicates insufficient rechargeable station information existed to contact the at least one rechargeable station, or combinations thereof.

5. The system of claim 1, wherein the at least partially rechargeable vehicles comprise a partially or fully rechargeable member of the group consisting of: cars, trucks, boats, helicopters, snowmobiles, jet skis, motorcycles, and combinations thereof.

6. The system of claim 1, wherein the computer instructions for instructing the processor to provide at least one message to the rechargeable station network is a member of the group consisting of: at least one predefined message, at least one custom message, or combinations thereof.

7. The system of claim 1, wherein the at least one user is a police department, a school, a fire department, a hospital, a government agency, a consumer, a business, an association, or combinations thereof.

8. The system of claim 1, wherein the at least one non-dispatchable power source is a wind power facility, a solar powered facility, ocean powered facility using wave height, currents or combinations thereof, or an intermittent water supply hydroelectric facility.

9. The system of claim 1, wherein the at least one dispatchable power source is a member of the group consisting of: a hydroelectric power plant, a hydrocarbon based electrical production facility, a nuclear power plant, a geothermal power generation facility, a bank of batteries, at least one capacitor, at least one fuel cell, an ocean powered facility using tidal power, or combinations thereof.

10. The system of claim 1, wherein the discretionary power consumption information of the at least one user comprises an amount of power that the at least one user requires during a time interval that can be determined by the administrator.

11. The system of claim 1, wherein the discretionary power consumption information is assigned a priority code based on power rates, a classification of the at least one user, a quantity of power needed by the at least one user, or combinations thereof.

12. The system of claim 1, wherein the dynamic information database further comprises a user contact device information is associated with each rechargeable station identification.

13. The system of claim 1, wherein the dynamic information database further comprises a rechargeable station location for each rechargeable station identification.

14. The system of claim 1, wherein the dynamic information database further comprises grouping information.

15. The system of claim 14, wherein the grouping information is a member of the group consisting of: a geographic zone, a quantity of power consumption needed by at least one user, a transmission capacity of the rechargeable station network, and combinations thereof.

16. The system of claim 1, wherein the at least one rechargeable station comprises: a controller, a controller identification code and a member of the group: a stored energy device, at least one fuel cell, or combinations thereof.

17. The system of claim 1, wherein the administrator is a member of the group consisting of: a dispatchable power supplier, a non-dispatchable power supplier, a government agency, a entity responsible for coordinating dispatchable and non-dispatchable power to the rechargeable station network, a processor associated with the dynamic information database, another digital notification and response system, an analog notification system, and combinations thereof.

18. The system of claim 1, wherein the at least one industry standard protocol is selected from the group consisting of: a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

19. The system of claim 1, wherein the data storage further comprises computer instructions enabling the administrator to cancel messages in progress and for the administrator to cancel messages scheduled for delivery at a future date and time.

20. The system of claim 1, wherein the data storage further comprises computer instructions for notifying the administrator when the at least one message has been delivered to the rechargeable station network.

21. The system of claim 1, wherein the data storage further comprises computer instructions for broadcasting the at least one message to a member of the group: at least one user at periodic intervals, at least one user in a defined geographic area, at least one user in a designated disaster zone, at least one user at a specific date and time, or combinations thereof.

22. The system of claim 1, wherein the administrator interface further comprises at least one security feature to control access to the administrator interface.

23. The system of claim 1, wherein the administrator interface comprises a "call me" feature for enabling the administrator to compose at least one individual message to send to the at least one user.

24. The system of claim 1, wherein the administrator interface further comprises a responder module comprising a receiver function for receiving responses from a member of the group: at least one user, at least one rechargeable station or combinations thereof.

25. The system of claim 24, wherein the responder module comprising an opt-in feature, an opt-out feature, or combinations thereof.

26. The system of claim 25, wherein the responder module collects response data from the rechargeable station network that indicates when at least one user contact device has received at least one message.

27. The system of claim 1, wherein the at least one message is an audio file, an image file, a video file, a text file, an electronic signal, or a combination thereof.

28. The system of claim 27, wherein the audio file is transmitted by email, phone, a link on a website, or combinations thereof.

29. The system of claim 28, wherein the audio file comprises an MP3 file, MP4 file, WAV file, AIFF file, AVI file, ACC file, or combinations thereof.

30. The system of claim 27, wherein the video file comprises an H.264 Mpeg.

31. The system of claim 1, further comprising computer instructions for instructing the at least one processor to generate at least one report using content in the dynamic information database.

32. The system of claim 1, wherein the data storage further comprises a text-to-sound file converter for translating the at least one message from text to a sound file.

33. The system of claim 1, wherein the dynamic information database further comprises at least one priority code associated with the at least one rechargeable station.

34. The system of claim 22, wherein the security feature comprises encryption of the administrator interface and the dynamic information database.

\* \* \* \* \*